US012112728B2

(12) United States Patent
Kman

(10) Patent No.: US 12,112,728 B2
(45) Date of Patent: Oct. 8, 2024

(54) GUITAR PICK HOLDER AND DISPENSER

(71) Applicant: Stephen J. Kman, Port Crane, NY (US)

(72) Inventor: Stephen J. Kman, Port Crane, NY (US)

( * ) Notice: Subject to any disclaimer, the term of this patent is extended or adjusted under 35 U.S.C. 154(b) by 203 days.

(21) Appl. No.: 18/070,681

(22) Filed: Nov. 29, 2022

(65) Prior Publication Data

US 2024/0177693 A1 May 30, 2024

(51) Int. Cl.
*G10D 3/173* (2020.01)
*A47F 1/12* (2006.01)

(52) U.S. Cl.
CPC ............... *G10D 3/173* (2020.02); *A47F 1/12* (2013.01)

(58) Field of Classification Search
CPC ...................................................... G10D 3/173
See application file for complete search history.

(56) References Cited

U.S. PATENT DOCUMENTS

| | | | |
|---|---|---|---|
| 3,992,975 A | 11/1976 | Gallagher | |
| 4,785,708 A | 11/1988 | Vaughn | |
| D309,674 S | 8/1990 | Gervase | |
| 5,649,634 A | 7/1997 | Irizarry | |
| 6,215,052 B1 | 4/2001 | Giddens et al. | |
| 6,933,430 B2 | 8/2005 | Oskorep | |
| 7,199,295 B2 | 4/2007 | Oskorep | |
| 7,626,103 B1 | 12/2009 | Phillips | |
| 7,847,171 B1 | 12/2010 | Kidd, III | |
| 9,418,633 B1 | 8/2016 | Storck | |
| 9,704,459 B1 * | 7/2017 | Paterson | G10D 3/173 |
| 10,043,495 B1 * | 8/2018 | Paterson | G10G 7/00 |
| 10,210,849 B1 | 2/2019 | Britt | |
| 10,347,227 B1 | 7/2019 | Britt | |
| 2018/0166049 A1 * | 6/2018 | Young | G10D 3/173 |
| 2024/0177693 A1 * | 5/2024 | Kman | G10D 3/173 |

* cited by examiner

*Primary Examiner* — Robert W Horn
(74) *Attorney, Agent, or Firm* — Bernhard P Molldrem, Jr.

(57) ABSTRACT

Holders and dispensers for guitar picks or plectra have an elongated base portion and an upper surface adapted for holding one or more of said picks or plectra, the base portion having right and left sides and having proximal and distal ends. The proximal end is configured for loading and dispensing picks. The base portion upper surface slopes upwards from the proximal to distal end; with the upper surface defining a plurality of pick positions. The side walls extend along the sides of said base portion rising above the base portion. The side walls have flanges each defining an elongated slots above the base portion. The proximal ends of the base portion and the channels are open to receive and dispense the picks and/or plectra. A key-ring slot may be present at the distal end.

8 Claims, 5 Drawing Sheets

GUITAR PICK HOLDER AND DISPENSER

FIELD OF THE INVENTION

This invention relates to dispensers for small thin items, and is more specifically directed to guitar picks. The invention is more particularly concerned with a pick dispenser that the guitar player can carry with him while practicing or performing, and from which he can quickly obtain a replacement pick, even while playing his or her instrument. Here the term guitar pick means a pick or plectrum, which is a thin, usually triangular or ovoid flat member that can be held between the thumb and forefinger for plucking one or more strings of the instrument. The term is meant to apply to picks and plectrums not only for guitars but also for other string instruments such as banjos, mandolins, balalaikas, and others, which usually (but not always) have frets along the neck of the instrument. These picks or similar plectrums can be used on a dulcimer, autoharp or ukulele.

Typical picks or plectra are formed of a tough and somewhat flexible material, e.g., celluloid, that is intended to simulate natural tortoiseshell. The picks can be somewhat triangular in shape, and quite thin, e.g., with a thickness of about one millimeter, but can vary from that depending on the preference of the musician. The typical guitar pick is in the form of a more-or-less triangular, but rounded shape, with a width at the base or gripped side being between about two and three centimeters, and a length along its axis from the base side to the nose or point of about four centimeters. These dimensions can vary greatly to satisfy the needs of a variety of musicians.

The guitar pick typically is not attached to the guitar or to the player. Because it is loose, it can be dropped accidently. When that happens, it is advantageous for another pick to be kept handy so the musician can replace it and keep on playing. However, prior attempts to provide a pick holder have not produced one that is particularly convenient, and often requires stopping play for a significant time to access the new pick.

Accordingly, there is a need for a pick holder and dispenser that is simple and quick both for dispensing a replacement pick when needed, and also for loading with a supply of picks prior to playing the instrument. There is also a need for the guitarist or other string instrument player to have the dispenser attached to the instrument or to the person in a way that allows the dispensing of a replacement pick to happen easily and quickly. It should be possible for the pick holder and dispenser to be attached to a convenient location, such as the guitar strap or to the musician's belt or to a neck lanyard, for example. It should also be configured so that the musician can simply slide a replacement pick out of the holder and dispenser when he or she needs to do that. The holder and dispenser should be of simple and straightforward construction with as few parts as are necessary.

OBJECTS AND SUMMARY OF THE INVENTION

Accordingly it is an object of the invention to provide a pick holder which can be easily loaded by inserting a supply of guitar picks of the musician's preference, and from which the picks can be dispensed, one at a time, by sliding them out.

It is another object that the pick holder and dispenser be small and of as simple construction as possible, preferably without springs, snaps, or other movable or breakable components.

It is a further object that the pick holder and dispenser be of a convenient size and with some means of attaching it to the guitar strap, to a fob, or to the musician's clothing to that it can be quickly accessed when needed.

Embodiments of the pick holder and dispenser of my invention can be configured for holding and dispensing one or more picks or plectra, and formed, for example, with an elongated base portion defined with a proximal end and a distal end. An upper surface of this base portion can be adapted for holding one or more of the picks or plectra each at a respective pick position thereon. The base portion has right and left sides that extend between the proxima and distal ends. The proximal end is configured for loading and dispensing of the picks or plectra. The base portion upper surface favorably slopes upwards from the proximal end towards the distal end. The upper surface can be configured to define a plurality of pick positions on it. Thus each pick in a stack of picks is kept until needed at a given position.

Left and right side walls extend along the left and right sides of the base portion and rise above the upper surface. Each of the side walls has an upper flange portion defining a channel portion at the respective left and right side adjacent the base portion; the base portion extends toward (but is spaced from) the upper flange portion of the other side wall, such that the two flanges define between each other an elongated opening above each side the base portion. The upper elongated opening can permit finger access to the picks in the holder and dispenser.

The proximal ends of the base portion and of the left and right channels are open for receiving and dispensing the picks and/or plectra.

The pick holder and dispenser may also have small dimples, buttons or bosses formed along a center line of the base portion on its upper surface, with each protruding a short distance above the upper surface. These dimples are adapted to contact a rear side or end of a pick or plectrum. These can serve to retain each such pick in a particular pick position. Alternatively or in addition, the upper surface of the base portion can formed as a series of stepped portions, which may correspond to respective pick positions. The pick positions may overlap somewhat.

The left and right side walls can be configured such that the channels receive edges of the picks, and hold and dispense picks and plectra that are of about the same width, which may vary somewhat from one pick or plectrum to another. For example, left and right channels can be adapted to receive, hold and dispense picks and plectra that have a width of approximately one inch (but may vary according to custom).

In one preferred version, the pick holder and dispenser may include a key-chain slot, formed in the distal end of said base portion. The slot may be of a dimension to fit onto a guitar strap or mandolin strap or banjo strap. In some versions, the pick holder-and-dispenser's side walls each have a tactile grip surface formed on a portion of it, as an assistance in the musician gripping it with his or her hand. With double-sided tape, the dispenser may be adhered, temporarily or permanently, to a side or back of the instrument.

DETAILED DESCRIPTION OF THE PREFERRED EMBODIMENT

Figure 1:
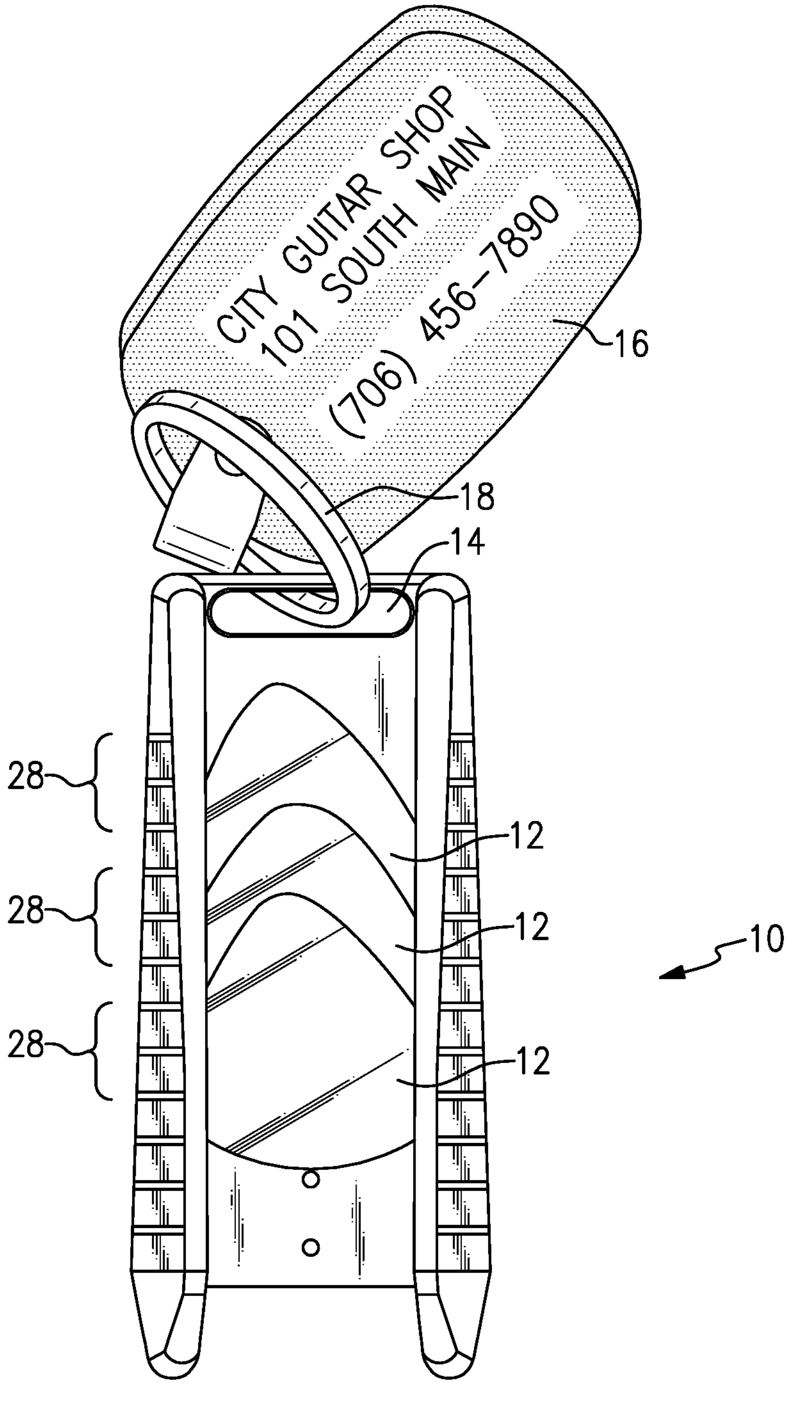
FIG. 1 is a perspective view showing one embodiment of the pick holder and dispenser, according to the present invention.

With reference to the Drawing Figures, and initially to FIG. 1 thereof, a pick holder 10 of my invention is formed as an elongated member for holding and dispensing picks or plectra 12, favorably all of a common, more-or-less usual dimension and shape. A key-ring slot 14 is formed transversely at a distal end, here shown with a key fob 16 and a key ring 18 that can be installed onto the slot 14 and the fob 16. The slot 14 may also be used to attach to a guitar strap (not shown) or to a lanyard or other similar item. As seen here for this example, there are left and right side walls 22 at the respective sides of the base wall 20, with at least some their surfaces being textured for enhanced gripping. There is an elongated gap 24 between the two side walls 22 to allow finger access of the picks.

Figure 2:
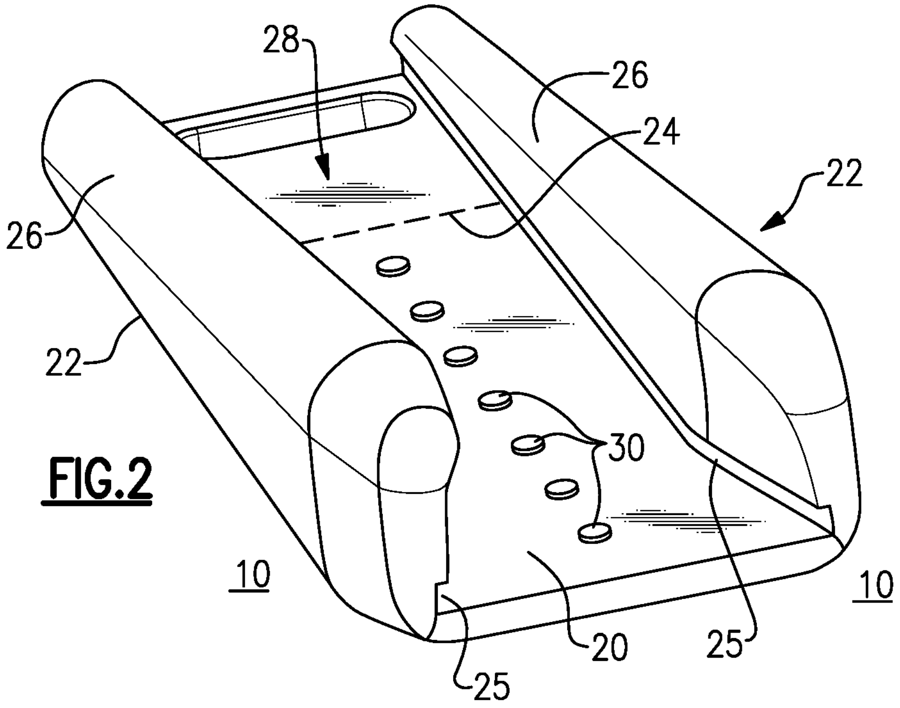
FIG. 2 is a perspective view of the pick holder and dispenser of this embodiment, as seen from the proximal end.
Figure 3:
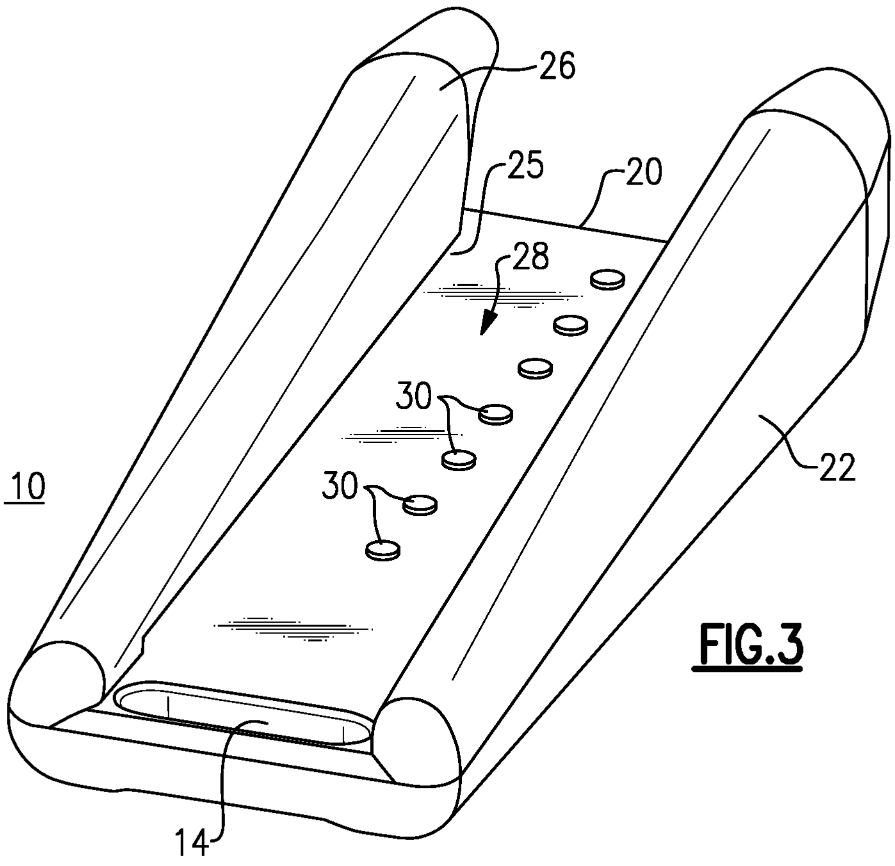
FIG. 3 is a perspective view thereof, as seen from the distal end.

FIGS. 2 and 3 are proximal and distal-end perspectives that show the main features of embodiments of the pick holder 10. As shown here the base wall or base portion 20 may have a flat or stepped configuration, with a series of dimples or button 30 positioned about midway across the base portion of the pick holder. The dimples or buttons 30 may define respective pick locations. The two sidewalls 22 rise from a respective side of the base portion 20, and each has an inwardly projecting flange 26. There is a space between the base portion and the respective flange 26 which serves as a longitudinal slot 25 on each side which the back corners of the picks 12 occupy. As shown in these two views, the base portion 20 (and the corresponding side slots or channels 25) are slanted upwards relative to the top part of the two side walls 22, going from the proximal end (FIG. 2) towards the distal end (FIG. 3). The key ring slot 14 is shown in FIG. 3 at the distal end. The flanges 26 of the two side walls 22 are shown here as being somewhat rounded, but that is not necessary for the invention.

As will be discussed, the dimples or buttons 30 engage the back edge of the picks to keep them from sliding out of the holder, although the picks can be disengaged and removed under normal finger pressure.

Figure 4:
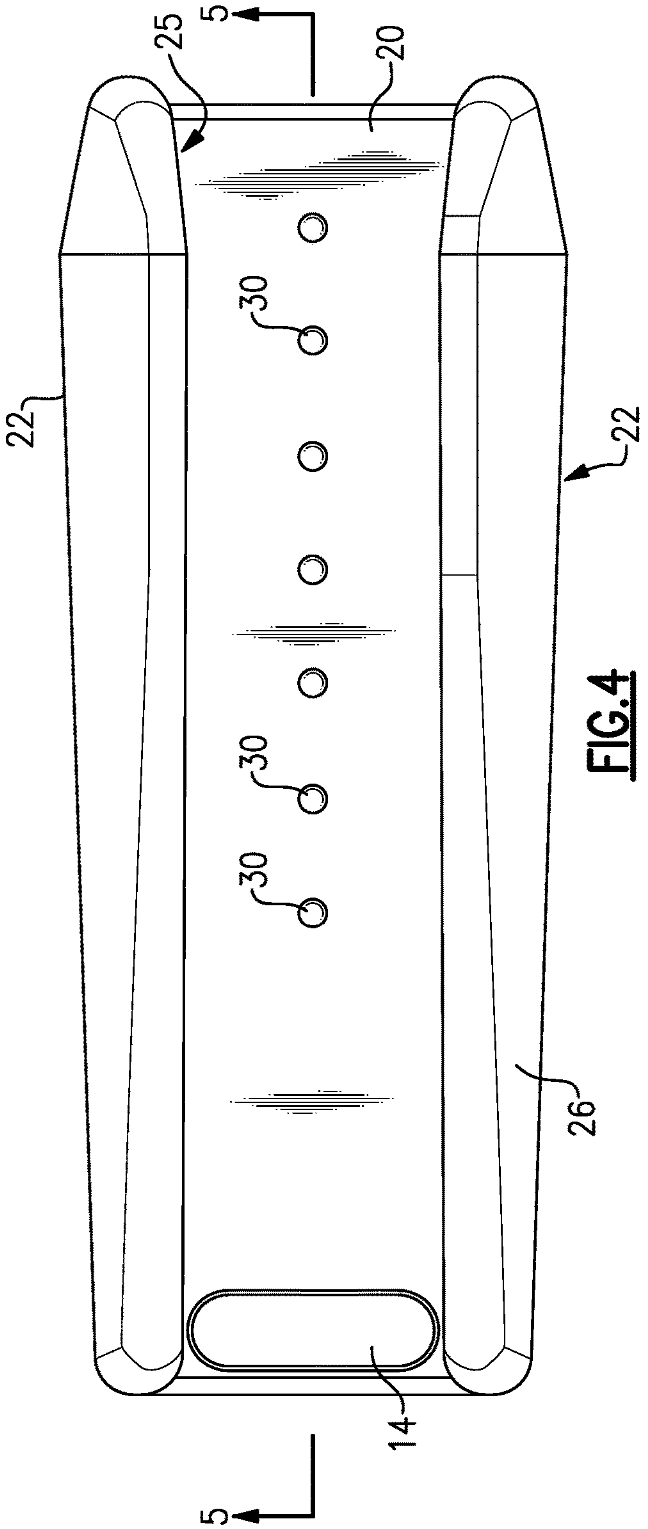
FIG. 4 is a top plan view thereof.
Figure 5:
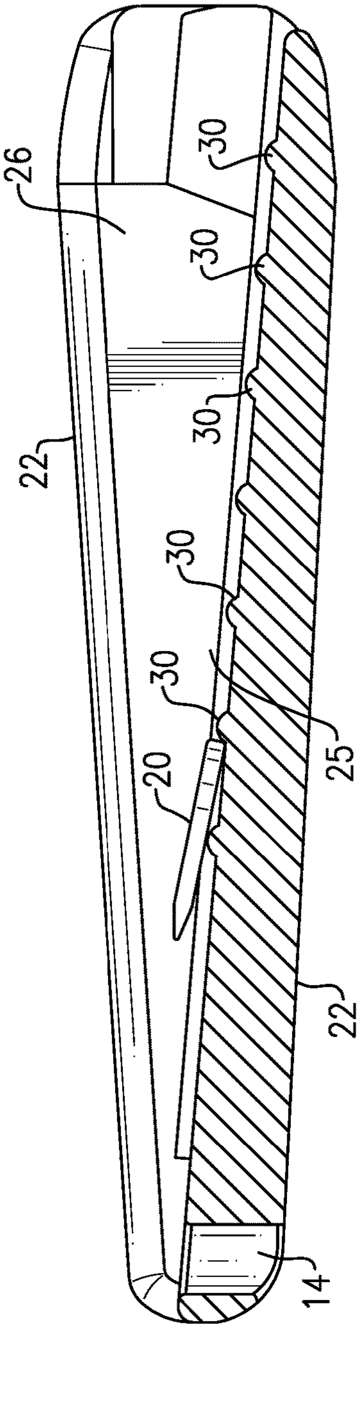
FIG. 5 is a cross-section taken at line 5-5 of FIG. 4.

FIGS. 4 and 5 are, respectively, a top plan view of the pick holder and dispenser, and a cross sectional view taken at line 5-5 of FIG. 4. Illustration of the step structure of the base portion 20 is omitted in FIGS. 4 and 5 (but may be present in variants), as that stepped configuration is not required in all embodiments. The back edges or heel portions of several guitar picks 12 each lodge against a respective ones of the buttons or dimples. FIG. 5 also shows the narrow or tip ends of the picks 12 each overlapping an adjacent one of the picks. These picks are removed or dispensed, one at a time, by sliding them out the proximal end (the right end in these views). Accordingly, the dimples or buttons (or in some embodiments, stair steps) define the pick positions for the respective guitar picks.

Figure 7:
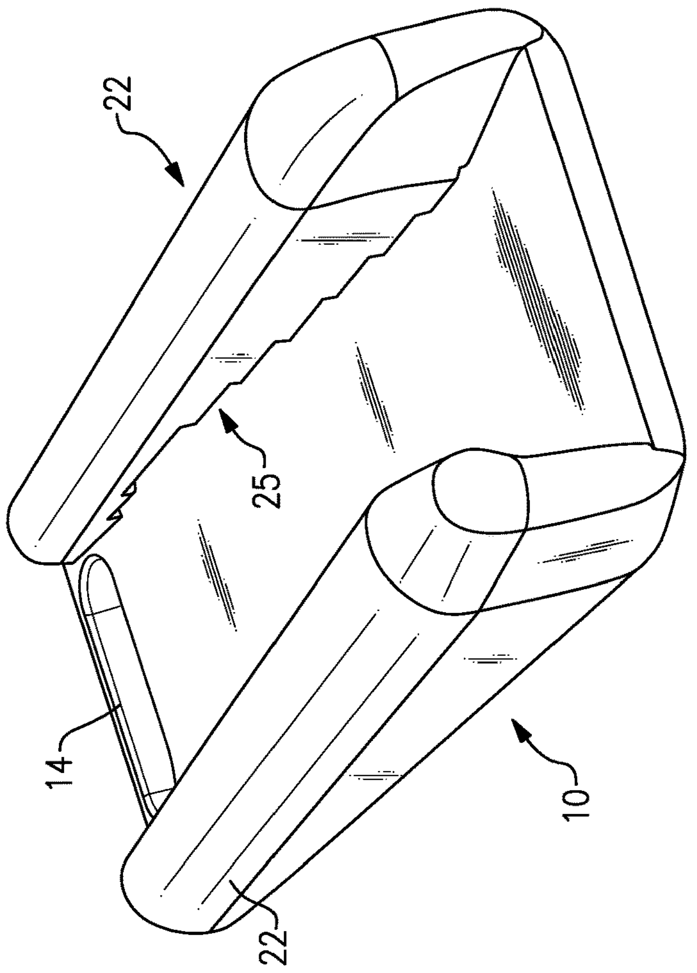
FIG. 7 is a perspective view of another variation.
Figure 6:
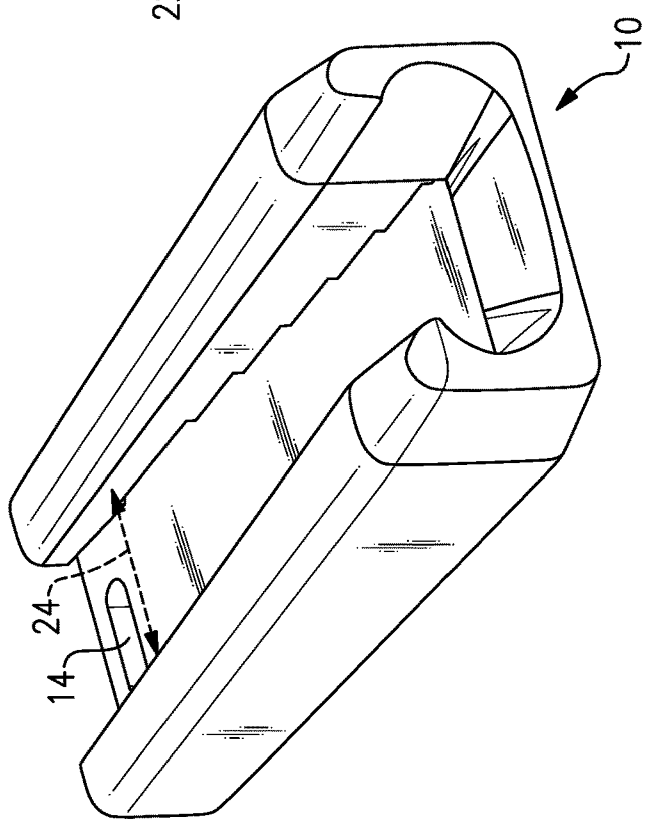
FIG. 6 is a perspective view of one possible variation thereof.

As seem in FIGS. 6 and 7 an embodiment the pick holder may have a flat, even configuration of the base portion 20, here illustrated without buttons or dimples. As seen in FIGS. 6 and 7, notches that engage picks can be in the upper surface of the slot or channel 25.

Figure 8:
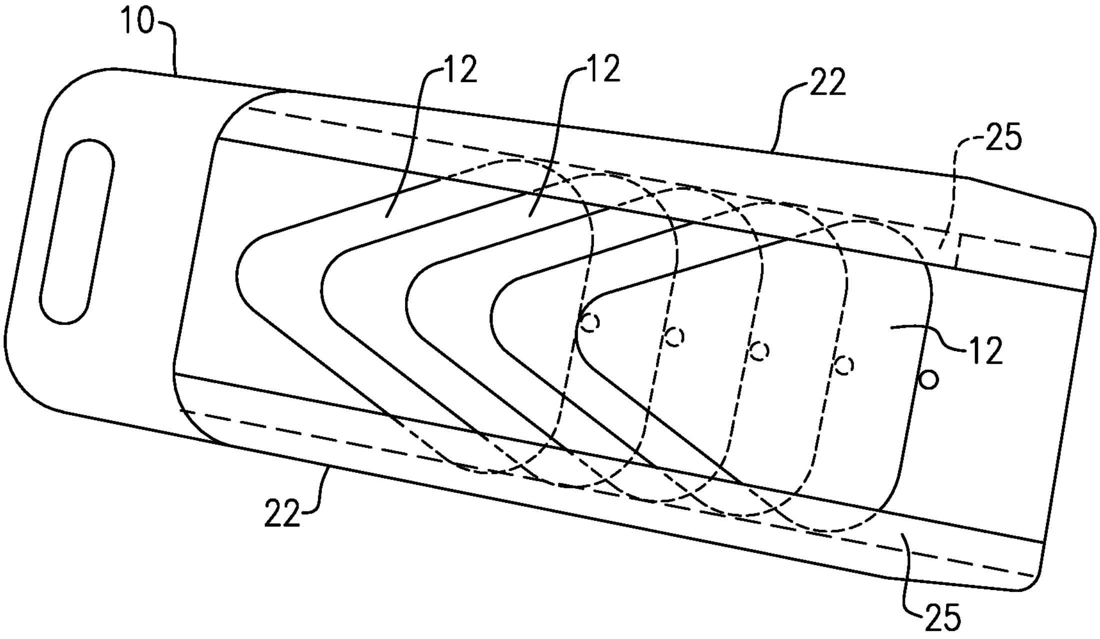
FIG. 8 is a plan view of another embodiment.

When the picks 20 are inserted into the holder, they arrange themselves in respective pick positions, as shown in FIG. 8. This pick 20 nearest the proximal end is available to be drawn out when a new pick is needed.

These guitar pick holders may be used with a variety of picks of different thicknesses over a fairly broad range, with different flexibility and somewhat different dimensions, and they may be preferred for use with mandolin, banjo, autoharp, ukulele, or other string instrument (not only guitars). The pick holder dispenser can be used by any string player to carry an adequate supply of picks for a performance or practice session, where the extra picks are readily and quickly available without having to stop a performance to obtain the replacement pick. These can be carried on the musician's body, i.e., on a belt clip or from a lanyard on the performer's neck, or elsewhere, or on the body of the instrument, where they do not interfere with the playing or performance. In addition, the holder dispenser of this invention is configured to be only as large as necessary to carry a supply of picks, and can be inexpensive to manufacture. These also make it possible for a guitar teacher to maintain a handy supply of extra picks for the student as well as for the teacher.

While this invention is illustrated and disclosed in terms of one or more preferred embodiments, the invention is not limited to such embodiments, and many variations thereof would present themselves to persons skilled in the art without departure from the invention as defined in the appended claims.

What is claimed is:

1. Holder and dispenser for a plurality of picks or plectra for guitars or other fretted string instruments; comprising a. an elongated base portion having an upper surface adapted for holding one or more of said picks or plectra, the base portion having right and left sides and having proximal and distal ends, the proximal end being configured for loading and dispensing of said picks or plectra; said base portion upper surface sloping upwards from said proximal end towards said distal end; with the upper surface defining a plurality of pick positions thereon;

b. Left and right side walls extending along said left and right sides of said base portion and rising above said upper surface, each of said side walls having an upper flange portion and defining a respective channel portion at the respective side of said base portion and the base portion extending toward but spaced from the upper flange portion of the other side wall, and the two flanges defining an elongated opening extending above the base portion and between the flange portions;

c. the proximal ends of said base portion and said channels being open to receive and dispense said picks and/or plectra.

2. The pick holder and dispenser according to claim 1 further comprising dimples or bosses formed along a center line of said base portion on said upper surface and adapted to contact a facing side of each said pick or plectrum.

3. The pick holder and dispenser according to claim 1, wherein said upper surface of said base portion is formed as a series of stepped portions.

4. The pick holder and dispenser according to claim 1 wherein said left and right side walls are configured so that said channels are adapted to receive, hold, and dispense picks and plectra that are in a predetermined range.

5. The pick holder and dispenser according to claim 4 wherein said channels are adapted to receive, hold and dispense picks and plectra that have a width of substantially one inch.

6. The pick holder and dispenser according to claim 1 wherein a key-chain slot is formed in the distal end of said base portion.

7. The pick holder and dispenser according to claim 1 wherein said side walls each have a tactile grip surface formed on a portion thereof.

8. The pick holder and dispenser according to claim 1 wherein notches configured to engage said picks are formed in an upper portion of the channel portions.

* * * * *